United States Patent [19]

Rao et al.

[11] Patent Number: 5,142,659
[45] Date of Patent: Aug. 25, 1992

[54] ESTIMATION OF LOCAL SURFACE GEOMETRY FROM RELATIVE RANGE IMAGES FOR OBJECT RECOGNITION

[75] Inventors: Kashipati G. Rao; Bruce E. Flinchbaugh, both of Dallas, Tex.

[73] Assignee: Texas Instruments Incorporated, Dallas, Tex.

[21] Appl. No.: 339,785

[22] Filed: Apr. 18, 1989

[51] Int. Cl.⁵ ............................................. G06K 9/00
[52] U.S. Cl. .................................... 382/9; 382/1; 356/3
[58] Field of Search ............... 382/9, 19, 28, 21, 1; 356/3, 4

[56] References Cited

U.S. PATENT DOCUMENTS

| | | | |
|---|---|---|---|
| 4,115,803 | 9/1978 | Morton | 382/28 |
| 4,569,078 | 2/1986 | Zuk | 382/1 |
| 4,700,398 | 10/1987 | Mizuno et al. | 382/1 |
| 4,739,401 | 4/1988 | Sack et al. | 382/1 |

*Primary Examiner*—Leo H. Boudreau
*Attorney, Agent, or Firm*—L. Joy Griebenow; Richard L. Donaldson; William E. Hiller

[57] ABSTRACT

An apparatus and method for improved segmentation and object recognition which describes objects and background appropriately based on calculations of desired local surface geometries such as local surface orientation, local surface curvature, surface extent and occluding boundaries, from sensed relative range images. Relative range data is used rather than converting such data to absolute range and then performing the desired geometric calculations.

25 Claims, 2 Drawing Sheets

ESTIMATION OF LOCAL SURFACE GEOMETRY FROM RELATIVE RANGE IMAGES FOR OBJECT RECOGNITION

BACKGROUND OF THE INVENTION

1. Field of the Invention

This invention relates to computer vision, and more particularly to an apparatus and method for improved object recognition based on local surface geometries calculated directly from relative range images.

2. Description of the Related Art

In recent years there has been considerable activity in understanding range images. Much of the activity has been devoted to working with indoor range finders, such as light stripe finders, which do not encounter a rollover problem because they are absolute range finders, or are working with very short distances. The remaining activity has focused on using outdoor range finders which encounter the rollover problem. These outdoor range finders have been somewhat successful only for very short distances because of rollover. These range finders concentrate working in just one band of range and therefore fail to address the rollover effect.

Rollover is particularly a problem for long distance sensing. It is especially evident when trying to segment an image into objects and background for recognizing objects using LADAR images. Segmentation into figure and ground, or target and clutter, is easier in LADAR images because of the availability of depth measurements. Depth also helps in resolving occlusion and in describing object shapes which aids significantly in object recognition. For example, objects may be segmented into parts and the parts could be described in terms of surface properties. These surface properties can then be used in object recognition models which furthers accurate object recognition.

LADAR images have rollover in depth due to inherent limitations of the precision of the hardware (for example, 8 bits of precision gives rollover every 256 units of depth) or due to the physics of the way the sensor measures depth. For example, depth measurement by phase causes rollover depending on the wavelength of the modulating wave used by the sensor. Regardless of the cause, bands of relative range result in each sensed image where each range band is equal to one rollover.

There are at least two problems attributed to rollover. The first involves object-background separation, also known as segmentation. Segmentation can become quite difficult due to the rollover effect. The situation often exists where objects "straddle" across range bands. When this happens, the sensor reports the same object as possibly located two, or more, different distances from the camera. This makes it difficult to separate the object from the background and accurately describe the scene.

The second problem caused by rollover is that the sensor may also report different objects as having the same distance from the camera when they may actually be one or more rollovers apart in distance and therefore actually not equal distances from the camera. This situation also creates difficulties in segmentation and accurate description of the scene.

One approach currently used for solving these problems involves converting a relative range image to an "absolute" range image, once in absolute range, rollover is not a problem. The specific approach obtains range values at all points in the image with respect to some base point in the image and then shifts the range values at range discontinuities that are estimated to be rollover boundaries. The resultant image is then segmented for figure and ground.

There are several problems with this approach. The main problem is that one must assume the segmentation into object and background corrects for rollover. In other words, the method assumes the segmentation solution, then solves for the rollover and finally solves for actual segmentation. The problems created by the assumption that the segmentation corrects for rollover are particularly acute when objects occupy several range bands. It is generally not possible to solve this problem automatically without first separating the objects from the background. Since this separation is the desired solution, one encounters the proverbial circular problem. At best such an approach can be performed by hand; it is very difficult to implement in a program for autonomous machine vision.

Other problems with the above approach include using more bits per pixel in the image due to correcting the range to absolute range. This results in greater memory requirements and longer computation time. Also, as more bits are used, the contrast in depth (ratio of the values of two pixels) provided in the new image is less than that in the original image. Thus, features which have poor contrast with the background may be more difficult to detect in the respective absolute range image. If, on the other hand, the absolute range image is represented in terms of the same number of bits as the relative range image, the resolution of the absolute range image is decreased. Again, this makes feature extraction difficult.

SUMMARY OF THE INVENTION

In view of the above problems associated with the related art, it is an object of the present invention to provide an apparatus and method for improved object recognition which estimates various surface geometries using relative range images, thereby avoiding the problems and inaccuracies encountered in converting relative range images to absolute range images.

Another object of the present invention is to provide an apparatus and method for computing local surface orientation and local surface curvature and estimating surface patches and occluding boundaries using relative range images.

These objects are accomplished in a preferred embodiment of the present invention by the provision of an apparatus and method which calculates various local surface geometries from sensed relative range image information and then locates all the jump boundaries based on these calculations. It then distinguishes between true jump edges (due to object-background boundaries) and spurious jump edges (caused by rollover in the sensed image), removes the spurious jump boundaries from the image and generates a new edge representation with the rollover edges removed.

The apparatus of a preferred embodiment of the present invention employs a range finding sensor which outputs LADAR images containing relative range information connected to a computation device which calculates various desired surface geometries based on the relative range information. These calculated surface geometries are then utilized by a representation generator to produce a new representation which can then be used by an object recognizer.

These and other features and advantages of the invention will be apparent to those skilled in the art from the following detailed description of a preferred embodiment, taken together with the accompanying drawings, in which:

DETAILED DESCRIPTION OF A PREFERRED EMBODIMENT

A preferred embodiment of the present invention discloses an apparatus and method which improves segmentation and object recognition by operating directly on sensed relative range information to determine desired local surface geometries. By operating directly on the relative range data there is no need to convert to absolute range before making the desired surface geometry computations, thereby avoiding conversion assumptions and attendant inaccuracies. Additionally, by simplifying the method of surface geometry computation, the method can now be implemented by computer for use in manned or unmanned applications.

Figure 1:
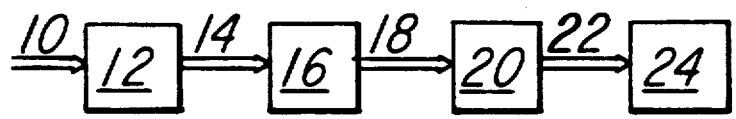
FIG. 1 is a block diagram depicting the apparatus of a preferred embodiment of the present invention.

An apparatus of a preferred embodiment of the present invention is depicted in FIG. 1. An observed scene 10 is sensed by range finding sensor 12. Sensor 12 outputs a relative range image 14 of observed scene 10 which is then inputted to computing device 16. Computing device 16 can be a computer, microcomputer, or other device of choice. Computing device 16 calculates the preselected desired local surface geometry(ies). This geometry 18 is then fed to a representation generator 20 which produces a new representation 22 of observed scene 10, making the particular preselected local surface geometry explicit. This new representation 22 is then inputted to an object recognizer 24. It is a preferred embodiment of the present invention that computing device 16 and representation generator 20 may be combined in one computing device which is capable of computing local surface geometry 18 information and generating a representation 22 based on that information. Such combination would be based on various considerations such as computer architecture, capability, cost, etc. An example of such a combined device, capable of running an algorithm according to the present invention, is the Explorer, designed by Texas Instruments Incorporated. Object recognizer 24 could be a human or a machine. Machine object recognizers involve additional complex problems which will not be addressed by the present invention and will not be further discussed herein.

Figure 2:
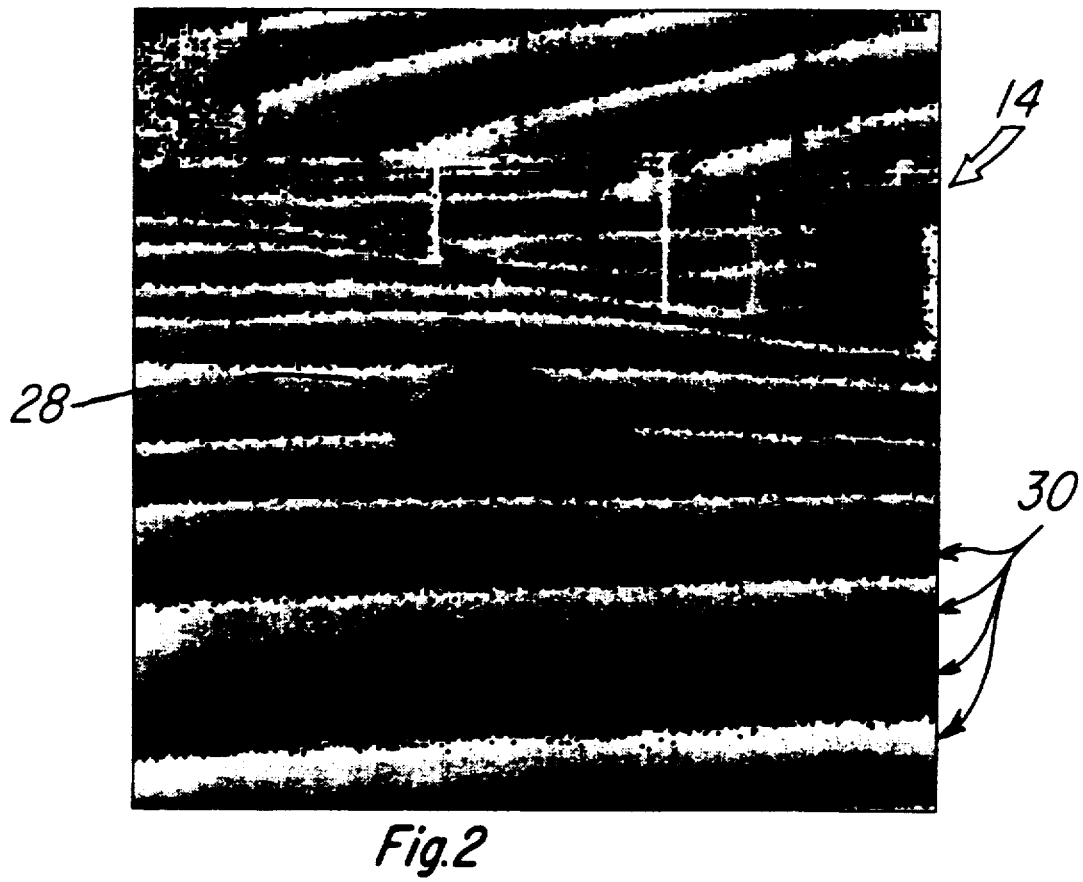
FIG. 2 is a pictorial representation of an initial LADAR image corresponding to an observed scene, showing rollover bands, containing an object to be recognized.

FIG. 2 shows a pictorial representation of an initial LADAR image 14 corresponding to an example of an observed scene 10, containing an object 28 to be recognized. As can be seen, the many rollover boundaries 30, also known as spurious jump boundaries, considerably distort image 14 and thereby fail to give enough information as to what exactly object 28 is or whether object 28 is indeed just one object. Prior to the 3 present invention, attempts to segment object 28 from the remaining background of image 14 would often yield inaccurate results for object segmentation, especially if the object recognizer was a machine.

According to a method of the present invention, sensed relative range information about each point of observed scene 10 is fed into computing device 16. After a particular local surface geometry is selected the computing device continues to calculate the requested data about the sensed relative range information until a different local surface geometry is requested. Examples of some of the object surface geometries which may be preselected include local surface orientation, local surface curvature, local surface patches (surface extent) and local occluding contours (jump boundaries). The method of the present invention relating to each of these example representation schemes and their relationship to the relative range rollover problem, will now be considered. As will be seen, each representation scheme emphasizes certain characteristics of image 14 and makes these characteristics explicit in representation 22.

Image 14 may be represented in terms of local surface orientation. This may be done by finding local planes (by least-squares) at each pixel. A new representation is then generated which makes the local surface orientations of objects explicit.

This surface orientation representation has the advantage that, being a differentiation operation on the range, it does not suffer from the rollover problem. The orientation of surfaces should not change drastically across spurious jump or rollover boundaries, but may abruptly change across true jump boundaries. This property can be used to distinguish true jump boundaries from spurious jump boundaries. The method of the present invention uses this property to remove spurious jump boundaries so that the generated representation 2 will contain only true jump boundaries. Now representation 22 can be properly segmented and such segmentation used by object recognizer 24. Furthermore, the local object surface representation also has the advantage of being local and therefore is not affected seriously by occlusion. It is also amenable to parallel computation.

Instead of local surface orientation, image 14 may be represented by local surface curvatures. These curvatures may be computed on the basis of the principal curvatures and direction at each point on the surface, or the gaussian and mean curvatures. Principal curvatures may be computed by convolving the relative range image information twice with a difference operator. This will provide the second derivative at each point and from that the curvature can be computed. Because this representation is also a differentiation operation on the range, it does not have a rollover problem. Local surface curvatures geometry is local and has the advantages of local orientation. It nevertheless is more noisy because it is the second derivative.

From the local surface curvature properties discussed above, image 14 may be represented as local surface patches. After convolving the relative range information twice with a difference operator, orientation discontinuities may be computed. These orientation discontinuities together with computed jump boundaries establish the boundaries of surface patches.

After the above convolution operation, the method according to the present invention compares the convolved values corresponding to each of the points in observed scene 10 and groups the respective points into patches based upon their corresponding values being continuous in depth and orientation, within a prescribed tolerance. In other words, using local surface curvature at each point, the edges of the surface patches can be determined. Where the curvature of the points is the same, these points define one region, or patch. A representation 22 is then generated which makes the local surface patches explicit.

Figure 3A:
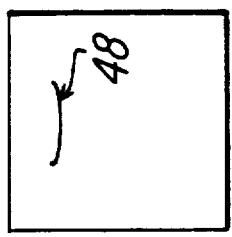
FIG. 3A is a pictorial representation of a sensed image depicting an example object.
Figure 3B:
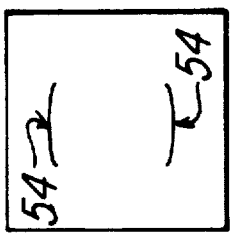
FIG. 3B is a pictorial representation of FIG. 3A generated by a preferred embodiment of the present invention with roll-over bands removed.

Consider for example, FIG. 3A which is a pictorial representation of a sensed image depicting an example object FIG. 3A may be considered to be an example of image 14. Rollover bands 30 such as those seen in FIG. 2, are quite visible around object 40. FIG. 3B is a representation of FIG. 3A but with the rollover bands removed for clarity, wherein the object 40 may be easily segmented from background 38.

Figure 3C:
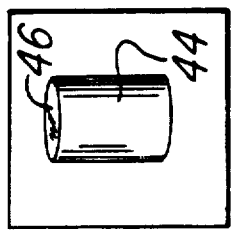
FIG. 3C is a pictorial representation of FIG. 3A demonstrating various surface patches generated by a preferred embodiment of the present invention.

FIG. 3C is a pictorial representation of FIG. 3B demonstrating various surface patches for object 40 generated by a preferred embodiment of the present invention. The entire drawing may be considered to be an example of representation 22. In this example, two surface patches are depicted, although a typical representation 22 may have many more. Surface patch 44 includes all points with the same local surface curvature of 1/R for this particular example. Likewise, surface patch 46, which is the top of object 40, encompasses all points with the same local surface curvature, such curvature being, for this example, constant.

The surface patch boundaries could be closed if they have small gaps; these closed boundaries then give rise to regions. The closed goundaries represent regions, where each region is a patch. Planar or quadric surfaces may be fit to the range points in these regions using least squares. As was true with the local surface geometries discussed previously, local surface patches can be used to verify if boundaries are true jump boundaries or spurious jump (rollover) boundaries. The verification is based on the fact surface patches should be continuous in depth and orientation (also within a tolerance) across rollover boundaries but not so across jump boundaries.

Surface patches formed according to the present invention can also be used for model-based object recognition. It should be noted that local surface curvature and surface patch representations have been computed by researchers based on absolute range, such as that obtained by an indoor triangulation-based range finder. These representation were not possible using relative range image information until the present invention, which makes these computations on relative range from a LADAR image and is additionally able to use these computations to find true jump boundaries from rollover boundaries.

Yet another representation of image 14 may be that of local occluding contours or boundaries. According to the method of a preferred embodiment, these boundaries may be extracted from the information generated about the local surface patch or local surface curvature geometries and labeled according to certain physical behaviors exhibited by each type of boundary.

Figure 3D:
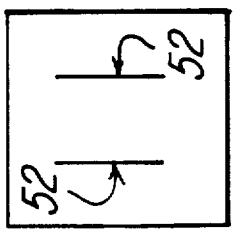
FIG. 3D is a pictorial representation generated by a preferred embodiment of the present invention showing only the orientation discontinuities of FIG. 3A.
Figure 3E:
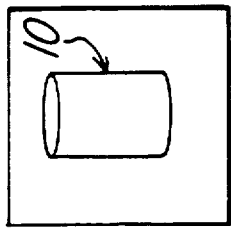
FIG. 3E is a pictorial representation of FIG. 3A showing only the roll-over boundaries.
Figure 3F:
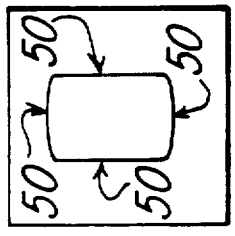
FIG. 3F is a pictorial representation generated by a preferred embodiment of the present invention depicting only the true jump boundaries of FIG. 3A.

Return for a moment to FIG. 3A. From the information contained therein, three representations 22 may be generated; an example of each is seen in FIGS. 3D, 3E and 3F. These figures represent images generated based on a prerequested type of boundary. All boundaries fit into one of three categories for purposes of the present invention: orientation discontinuities, spurious jump (rollover) boundaries 34 (as seen in FIG. 3E), and true jump boundaries. The ability to differentiate between certain types of boundaries, and especially to locate true jump boundaries aid considerably in segmentation and therefore object recognition.

FIG. 3D demonstrates the boundary known as an orientation discontinuity boundary 48. An orientation discontinuity is also known as a crease and is not considered viewer dependent. FIG. 3 3F exhibits boundaries 50 which are true jump boundaries.

Figure 3G:
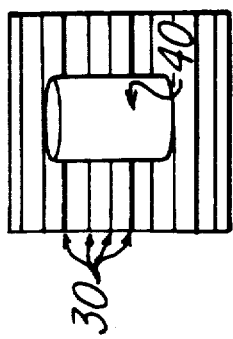
FIG. 3G is a pictorial representation generated in accordance with a preferred embodiment of the present invention showing only the limb boundaries of FIG. 3A.
Figure 3H:
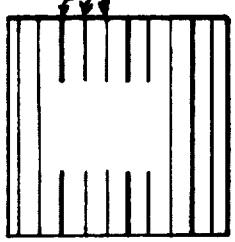
FIG. 3H is a pictorial representation generated in accordance with a preferred embodiment of the present invention depicting only the nonlimb true jump boundaries of FIG. 3A.

True jump boundaries may be further separated into limb and nonlimb boundaries. The method of the preferred embodiment of the present invention determines the difference between these two kinds of true jump boundaries, by computing the tangent (normal to the surface) at each point. If the viewpoint of the camera is considered to be $\bar{v}$ and the normal at a point to be $\bar{F}$, when $\bar{F}\cdot\bar{v}=0$, limb true jump boundaries 52 have been located, as seen in FIG. 3G. Limb jump boundaries are considered viewer dependent. When $\bar{F}\cdot\bar{v}\neq 0$, nonlimb true jump boundaries 54 exist (seen in FIG. 3H). Such nonlimb boundaries are viewer independent. Both limb and nonlimb jump boundaries give different representations of the image to enable the object recognizer to better understand the image for recognition and are therefore quite valuable in accurate scene segmentation and object recognition.

Additionally, certain constraints which jump and rollover boundaries have been found to satisfy may be programmed into computing device 16 or used by image generator 20 to further aid in cleaning up features in image 14 into true jump boundaries and rollover boundaries. The following constraints are for example only and are not intended in any way to limit the scope of the present invention:

Rollover boundaries are near 255 to near 0 jumps in sensed depth, when employing 8 bits of precision. The exact jump depends on the noise in the image.

If the boundary is vertical in the image plane or nearly so, it is a true jump boundary.

Assuming planar earth (less restrictive than flat earth), the variation of depth on either side of a rollover boundary is linear (decreasing on one side away from the boundary and increasing on the other side away from the boundary). If there are several bands of range for the ground, a sawtooth function is obtained for the variation of depth when traversing in the direction perpendicular to the bands. If the background is not planar, the variation is not completely linear. Nevertheless, it still exhibits this behavior near the rollover boundaries. Jump boundaries will not show such behavior.

By using constraints such as those exemplified above, two representations may be generated from range image 14. The first representation in terms of occluding contours (true jump boundaries only) in the scene, has been discussed above. This representation is useful in demarcating the objects in the scene from the background.

The second representation is one in terms of just the rollover boundaries. This is a novel representation of the scene and is in some sense a sparse contour map of the scene. It will also help in identifying planar versus non-planar regions in the background (planar regions should have parallel rollover boundaries). If planar, it will also be a quick guide to the orientation of the plane. This is related to the angle of the rollover boundaries to the horizontal in the image.

Figure 4:
FIG. 4 is a pictorial representation of FIG. 2 indicating all the jump boundaries detected from the initial LADAR image, using a preferred embodiment of the present invention.
Figure 5:
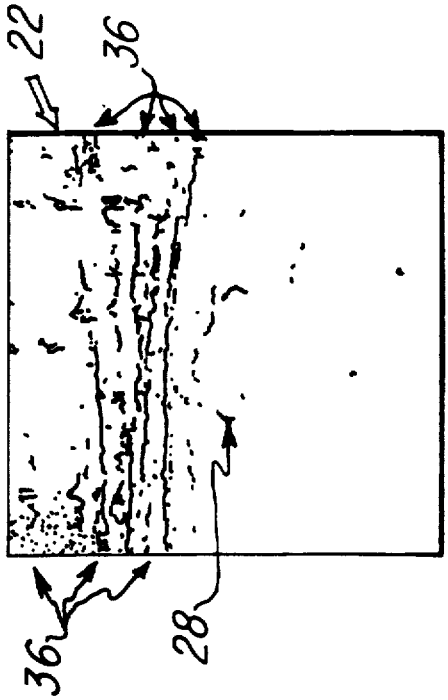
FIG. 5 is a pictorial representation of FIG. 2 showing only the true jump boundaries resulting from the application of a preferred embodiment of the present invention.

Returning now to FIG. 2, which shows a representation of an initial LADAR image 14, containing an object 28 to be recognized. After employing the method of a preferred embodiment of the present invention whereby local surface boundaries were preselected from among the various surface geometries, the representation of FIG. 4 is generated. FIG. 4 shows an example of generated representation 22 which shows all jump boundaries 34, spurious and true, detected from the initial LADAR image of FIG. 2. As can be seen, object 28 can more easily be seen, but its outline and range location to some degree still remains uncertain. By removing the rollover boundaries as seen in FIG. 5 and leaving only true jump boundaries 36 including the true jump outline of object 28, object 28 is more clearly seen to be a tank. Accurate segmentation and object recognition is more certain if representation 22 contains information such as the example seen in FIG. 5.

It should be noted that the examples seen in FIGS. 2-5 are for purposes of explanation and demonstration only and should not in any way limit the scope of the present invention. While a specific embodiment of the invention has been shown and described, various modifications and alternate embodiments will occur to those skilled in the art. Accordingly, it is intended that the invention be limited only in terms of the appended claims.

We claim:

1. A method for improved scene segmentation, comprising:
   sensing relative range information about each of a plurality of points of an observed scene;
   computing desired local surface geometric data based on said relative range information; and
   segmenting said scene based on said desired local surface geometric data.

2. The method for improved scene segmentation of claim 1, wherein said desired local surface geometric data is local surface orientation, said computing step further comprising:
   inputting said relative range information;
   convolving said information with a difference operator; and
   generating a representation containing said convolved information.

3. The method for improved scene segmentation of claim 1, wherein said desired local surface geometric data is local surface curvature, said computing step further comprising:
   inputting said relative range information;
   convolving said information twice with a difference operator; and
   generating a representation containing said convolved information.

4. The method for improved scene segmentation of claim 1, wherein said desired local surface geometric data is local surface patches, said computing step further comprising:
   inputting said relative range information;
   convolving values based on said convolved information, said
   comparing values based on said convolved information, said values corresponding to each of said sensed points of an observed scene;
   grouping said sensed points based upon said corresponding values that are continuous in depth and orientation, within a predetermined tolerance, into at least one of said local surface patches; and
   generating a representation containing at least one local surface patch based on said convolved information.

5. The method for improved scene segmentation of claim 4, wherein between said steps of grouping and generating is a step comprising:
   characterizing each grouping by fitting a planar or quadratic patch to said at least one of said local surface patches.

6. The method for improved scene segmentation of claim 1, wherein said desired local surface geometric data is at least one local surface boundary, said computing step further comprising:
   inputting said relative range information;
   convolving said information twice with a difference operator;
   comparing convolved values corresponding to each of said points of an observed scene;
   grouping said points based upon said corresponding values that are continuous in depth and orientation, within a predetermined tolerance, into at least one local surface patch;
   locating boundaries formed by a junction between a plurality of said of said local surface patches; and
   generating a representation containing said boundaries based on said extraction.

7. The method for improved scene segmentation of claim 6, wherein said local surface boundary is a true jump boundary, said true jump boundary resulting from an object-background boundary.

8. The method for improved scene segmentation of claim 6, wherein said local surface boundary is a spurious jump boundary, said spurious jump boundary resulting from rollover in said image.

9. A method for more accurate object recognition due to improved scene segmentation, comprising:
   sensing relative range information about each of a plurality of points of an observed image;
   estimating local surface boundaries of objects found in said image;

locating all jump boundaries based on said local surface boundaries;

distinguishing between true jump boundaries from spurious jump boundaries, wherein said true jump boundaries are due to object-background boundaries and said spurious jump boundaries result from rollover within said image;

removing said spurious jump boundaries whereby only true jump boundaries remain;

generating a representation with only true jump boundaries present; and recognizing object based on said generated representation.

10. The method for more accurate object recognition of claim 9, wherein said step of estimating further comprises:

inputting said relative range information;

convolving said information twice with a difference operator;

comparing values based on said convolved information, said values corresponding to each of said sensed points of an observed scene;

grouping said points based upon said corresponding values that are continuous in depth and orientation, within a predetermined tolerance, into at least one local surface patch; and locating boundaries formed by the junction of a plurality of said local surface patches.

11. The method for more accurate object recognition of claim 9, wherein said step of distinguishing is accomplished based on constraints which said true jump boundaries and said spurious jump boundaries are known to satisfy.

12. An apparatus for improved object recognition, comprising:

a sensing device for sensing relative range information for each of a plurality of points of an observed image and outputting such information;

a computing device connected to said sensing device and adapted to receive therefrom said relative range information, to calculate a preselected desired local surface geometry based on said relative range information, and to output data based on said preselected desired local surface geometry;

a representation generator connected to said computing device and adapted to receive therefrom said data based on said preselected desired local surface geometry and to generate a representation based on said local surface geometry wherein the preselected local surface geometry is made explicit; and an object recognizer connected to said representation generator and adapted to receive therefrom said representation based on said preselected desired local surface geometry and to recognize objects found in said representation.

13. The apparatus for improved object recognition of claim 12, wherein said sensing device is a range finder.

14. The apparatus for improved object recognition of claim 13, wherein said range finder is an outdoors long distance range finder.

15. The apparatus for improved object recognition of claim 12, wherein said object recognizer is a machine.

16. The apparatus for improved object recognition of claim 12, wherein said apparatus is used in vehicles.

17. The apparatus for improved object recognition of claim 16, wherein said vehicle is autonomous and unmanned.

18. The apparatus for improved object recognition of claim 12, wherein said preselected desired local surface geometry is local surface orientation.

19. The apparatus for improved object recognition of claim 18, wherein said computing device is capable of calculating said local surface orientation by inputting said relative range information and fitting local planes thereto.

20. The apparatus for improved object recognition of claim 12, wherein said preselected desired local surface geometry is local surface curvature.

21. The apparatus for improved object recognition of claim 20, wherein said computing device is capable of calculating said local surface curvature by inputting said relative range information and convolving said information twice with a difference operator.

22. The apparatus for improved object recognition of claim 12, wherein said preselected desired local surface geometry is local surface extent.

23. The apparatus for improved object recognition of claim 22, wherein said computing device is capable of calculating said local surface extent by inputting said relative range information; convolving said information twice with a difference operator; comparing values based on said convolved information, said value corresponding to each of said sensed points of an observed scene; and grouping said sensed points based upon said corresponding values that are continuous in depth and orientation, within a predetermined tolerance, into at least one local surface extent.

24. The apparatus for improved object recognition of claim 12, wherein said preselected desired local surface geometry is occluding boundaries.

25. The apparatus for improved object recognition of claim 24, wherein said computing device is capable of calculating said local occluding boundaries by inputting said relative range information; convolving said information twice with a difference operator; comparing values based on said convolved information, said values corresponding to each of said sensed points of an observed scene; grouping said sensed points based upon said corresponding values that are continuous in depth in orientation within a predetermined tolerance, into at least one local surface extent; and locating boundaries formed by a junction between a plurality of said local surface extent.

* * * * *